Sept. 18, 1951  J. O. GEISSBUHLER  2,568,494
VEHICLE HEAD LAMP
Filed June 30, 1949  3 Sheets-Sheet 3

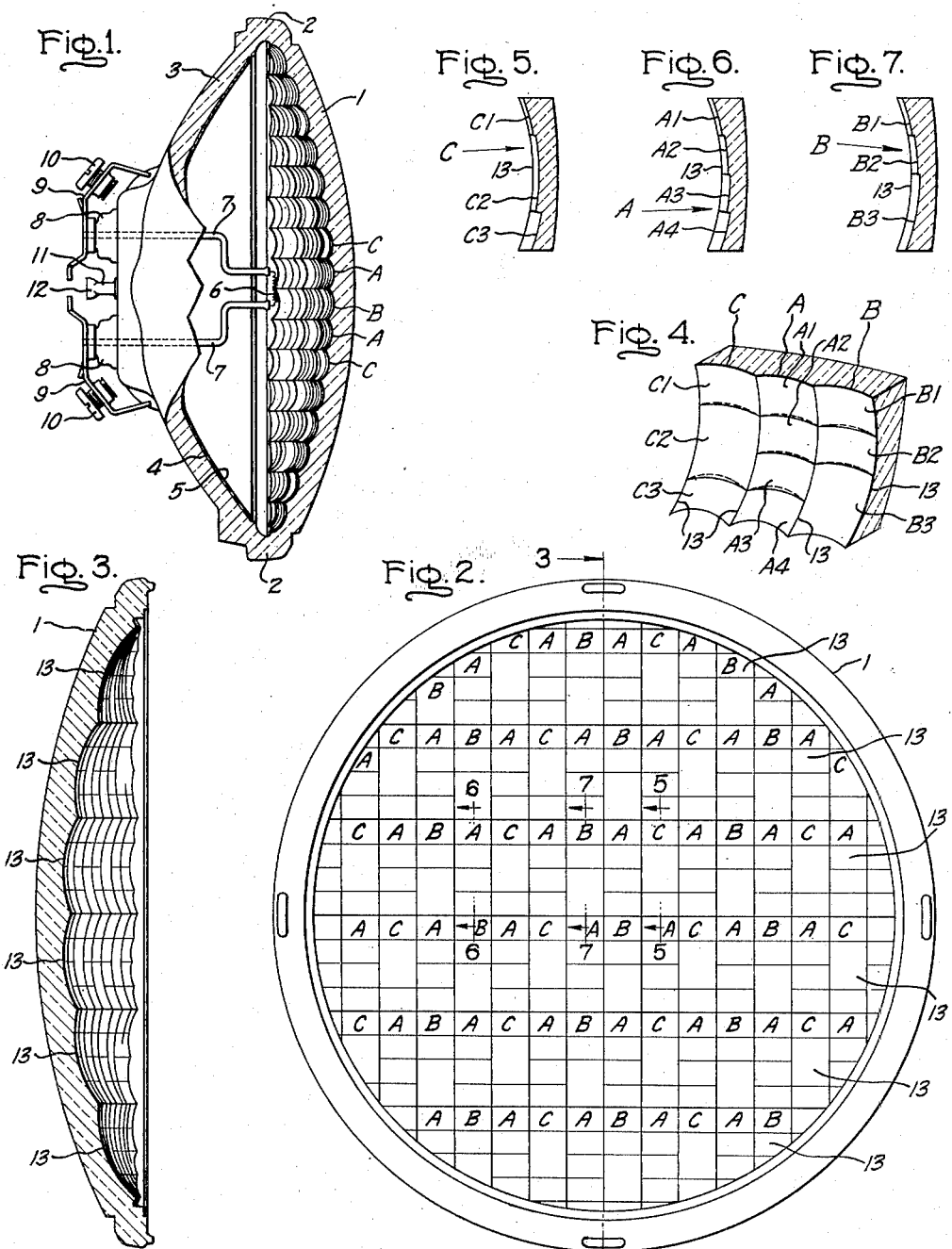

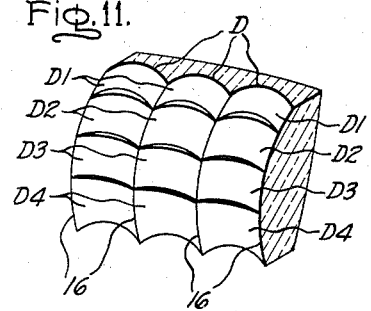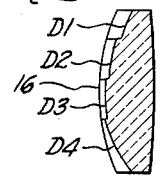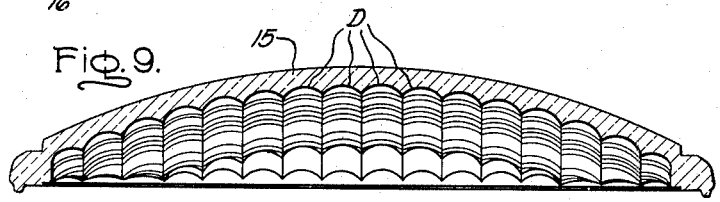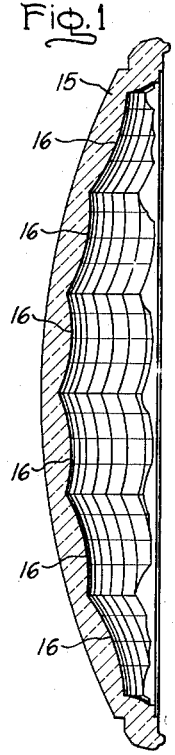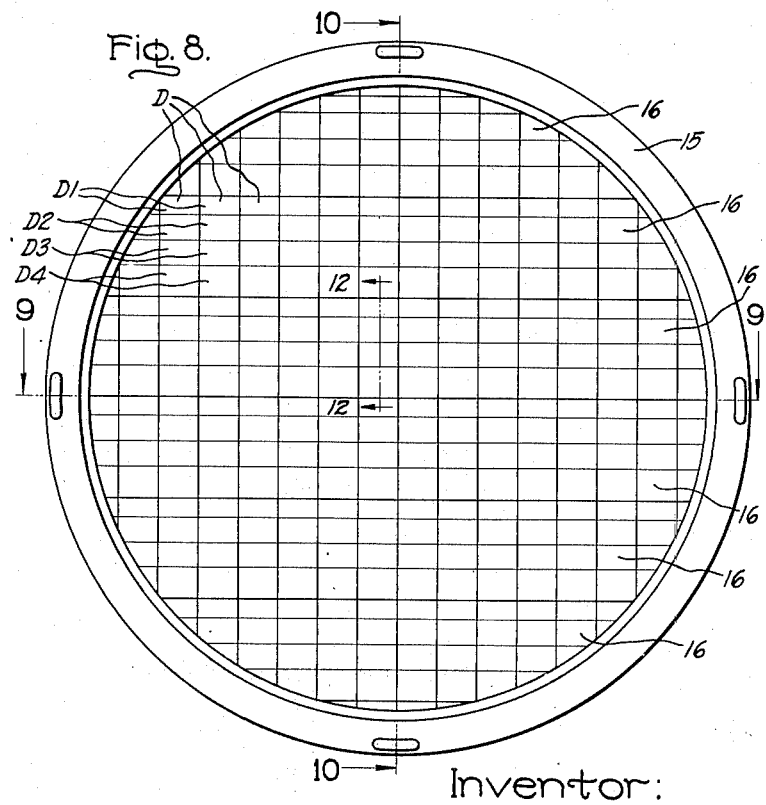

Inventor:
John O. Geissbuhler,
by Vernet C. Kauffman
His Attorney.

Patented Sept. 18, 1951

2,568,494

UNITED STATES PATENT OFFICE 2,568,494

VEHICLE HEAD LAMP

John O. Geissbuhler, South Euclid, Ohio, assignor to General Electric Company, a corporation of New York Application June 30, 1949, Serial No. 102,195

7 Claims. (Cl. 240—41.4)

My invention relates, in general, to vehicle headlights and to light-directing elements or lenses therefor.

There are certain headlight applications, such as for tractors and bicycles for instance, where it is desirable to illuminate the ground area immediately in front of the vehicle as well as extending for some distance forwardly thereof, and with more or less uniform intensity. For this purpose it has been proposed to employ a headlight mounted on the vehicle with its optical axis tilted downwardly, and adapted to project a light beam having a beam pattern of more or less inverted keystone shape and, in general, increasing in intensity from bottom to top. The inverted keystone shape pattern of the light beam from the lamp assures the illumination of a more or less rectangular area of the ground stretching out ahead of the vehicle.

It is an object of the present invention therefore to provide a headlamp which will project a light beam having a beam pattern of approximately inverted keystone shape.

Another object of my invention is to provide a lens for a headlamp which will redirect parallel light rays from the headlamp reflector into a light beam having a vertical beam pattern of approximately inverted keystone shape.

In accordance with the invention, the lens or other light-directing member of the headlamp is provided with a series of horizontal primary flutes of relatively large size for vertically spreading the light rays and having superimposed thereon a series of vertical secondary flutes of relatively small size and each of progressively increasing light spread throughout its vertical extent to horizontally spread the resultant light beam therefrom throughout a wider angle at the bottom than at the top. For this later purpose the secondary vertical flutes may be conveniently divided horizontally into a plurality of individual flute segments of successively increased horizontal light spread.

Further objects and advantages of my invention will appear from the following detailed description of species thereof and from the accompanying drawings.

Figure 13:
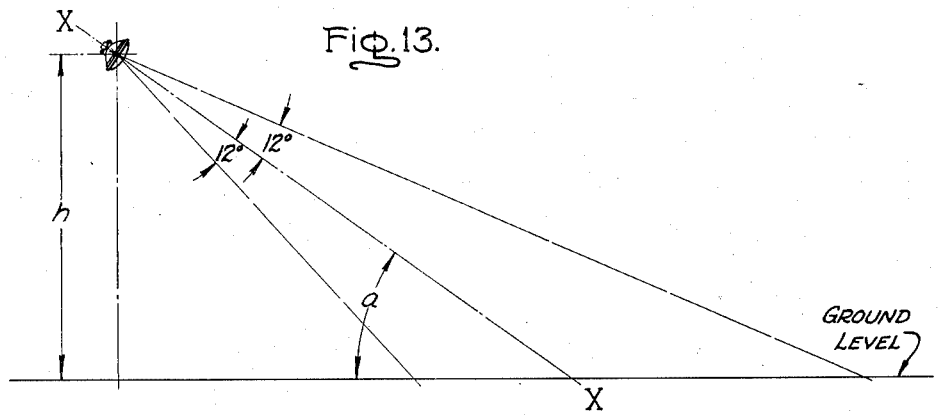
Figure 14:
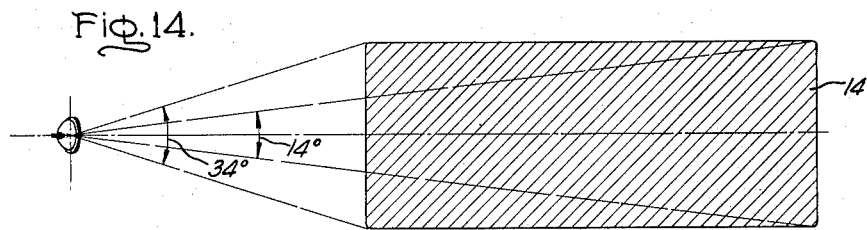
Figure 15:
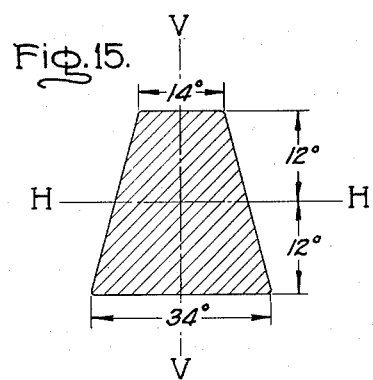

In the drawings, Fig. 1 is a plan view, partly in section, of a light projection device comprising my invention; Fig. 2 is a rear elevation of the lens of the light projection device shown in Fig. 1; Fig. 3 is a vertical section on the line 3—3 of Fig. 2; Fig. 4 is a fragmentary perspective view of a portion of the lens showing in detail the construction of the various flutes thereon; Figs. 5, 6, and 7 are fragmentary vertical sections on the lines 5—5, 6—6, and 7—7, respectively, of Fig. 2; Fig. 8 is a rear elevation of a modified form of lens according to the invention; Figs. 9 and 10 are horizontal and vertical sections, respectively, on the lines 9—9 and 10—10 of Fig. 8; Fig. 11 is a fragmentary perspective view of a portion of the modified lens shown in Figs. 8-10 and showing in detail the construction of the flutes thereon; Fig. 12 is a fragmentary vertical section on the line 12—12 of Fig. 8; Fig. 13 is a diagrammatic illustration showing, in side elevation, the manner in which the light projection device according to the invention is used and the path of the light beam emitted thereby; Fig. 14 is a similar illustration showing, in top or plan view, the light projection device in use and the ground pattern of the light beam produced thereby; and Fig. 15 is a view showing the beam pattern, in a plane normal to the reflector axis, of the light projection device according to the invention.

In the accompanying drawings, the invention is there shown as applied to a self-contained reflector lamp of the "sealed beam" type described and claimed in U. S. Patent 2,148,314, D. K. Wright, issued February 21, 1939, and assigned to the assignee of the present invention. As shown in Fig. 1, the said lamp comprises a preformed glass lens section 1 constructed in accordance with the invention and fusion-sealed at its periphery, as indicated at 2, to the rim of a preformed concave glass reflector section 3 to form therewith the envelope of the lamp. The concave inner surface 4 of the reflector section 3 is of approximately paraboloidal shape and is covered with a coating 5 of a suitable metal, such as aluminum for instance, to form a reflecting surface. A concentrated light source or filament 6, preferably in the form of a horizontally extending linear coil of tungsten wire, is mounted within the lamp envelope at approximately the focal point of the reflecting surface 5. The filament 6 is electrically connected to and is supported in place within the lamp envelope by lead-in wires 7 which extend through openings (not shown) in the wall of the reflector section 3 at the rear thereof and are secured at their outer ends, as by soldering for instance, to metal thimbles or ferrules 8 fusion-sealed at their rims to the exterior of the reflector section 3 around the said openings. Metal contact or terminal lugs 9 are suitably secured, as by soldering, to the closed ends of the metal thimbles 8 and are provided with terminal screws 10 for connecting the lamp to a suitable source of current supply. The lamp envelope is exhausted and, if desired, filled with a suitable inert gas such as argon, nitrogen, or mixtures thereof, through an exhaust tubulation 11 at the apex of the reflector section 3, which tubulation is afterwards tipped off, as indicated at 12, to hermetically seal the lamp envelope.

As shown in Figs. 2 and 3, the lens 1 is divided into a series of horizontally extending primary flutes 13 for vertically spreading the light rays from the lamp. These horizontal flutes 13 are preferably of concave shape as shown in Fig. 3 and are of relatively large size. Thus, in the particular case illustrated wherein the lens 1 is of the order of around 4½ inches in outside diameter, the flutes 13 have a vertical height of around ⅝ inch or so and are curved to a radius of the order of from around ⅜ inch to 1 inch or thereabouts.

Superimposed on each of the horizontal primary flutes 13 are a series of vertically extending secondary flutes A, B, and C for horizontally spreading the light rays from the lamp. The vertical flutes A, B, and C may be either of concave or convex shape, preferably of concave shape as shown, and are of relatively small size having, in the particular case shown, a horizontal width of around ¼ inch or so and being curved to a radius of the order of from around $\frac{1}{16}$ inch to ½ inch or thereabouts.

In accordance with the invention, each of the vertical flutes A, B, and C within each primary horizontal flute 13 is of progressively increasing light spread throughout its vertical extent in order to horizontally spread the resultant light beam therefrom throughout a wider angle at the bottom than at the top. For this purpose, each of the vertical flutes A, B, and C is horizontally divided into a plurality of individual flute segments A1, A2, B1, B2, C1, C2, etc., of successively increased horizontal light spread. In the particular form of lens shown in Figs. 2-7 wherein the horizontal primary flutes 13 are of concave shape, the individual flute segments A1, A2, etc. within each vertical secondary flute A, B, or C are of successively increased light spread from top to bottom of the vertical flute. The following table sets forth the horizontal light spread of the various flute segments A1, A2, etc. within each of the vertical flutes A, B, and C.

| Flute Segment | Horizontal Light Spread |
| --- | --- |
|  | Degrees |
| A1, B1, C1 | 12 |
| A2, B2, C2 | 18 |
| A3, B3 | 24 |
| A4, C3 | 32 |

It will be observed that flute A is horizontally divided into four individual flute segments A1, A2, etc. of more or less equivalent vertical extent while flutes B and C are divided into only three individual flute segments B1, B2, B3 and C1, C2, C3, with segments B3 and C2 of approximately twice the vertical extent of the other flute segments in each flute B and C. This difference in the construction of the flutes A, B, and C is for the purpose of obtaining greater uniformity in the distribution of the light throughout the beam pattern and to avoid dark spots therein.

Because of the progressively increasing horizontal spread of the various vertical flutes A, B, and C, the pattern of the resultant light beam from each of these secondary flutes is therefore of more or less inverted keystone shape as shown in Fig. 15. The final beam produced by the lamp as a whole is the cumulative effect of the superimposed individual light beams from the various vertical flutes A, B, and C, each individual beam being of a size corresponding to that of the final beam from the lamp. As indicated in Fig. 15, the horizontal spread of the light beam from the lamp is symmetrical about the vertical V—V through the axis X—X (Fig. 13) of the lamp and increases from around 14° at the top to around 34° at the bottom. The vertical spread is around 12° above and around 12° below the horizontal H—H through the axis X—X of the lamp.

When mounted on a vehicle such as a tractor at a point a short distance back from its forward end and at a height $h$ of 5 feet or so above ground level and tilted downwardly at a relatively steep angle $a$ of the order of 35° or thereabouts, as shown in Fig. 13, the ground pattern of the light beam from the lamp according to the invention is substantially as shown by the shaded area designated 14 in Fig. 14. From this illustration it will be apparent that a more or less rectangular area of the ground ahead of the vehicle will be illuminated from a point immediately in front of the vehicle and extending for some distance forwardly thereof. Such an arrangement therefore provides the operator of the vehicle with adequate illumination of the work area at a point immediately forward of the vehicle as well as satisfactory illumination of the ground for some distance forwardly.

In the modified lens 15 shown in Figs. 8-12, the horizontal primary flutes 16 are of convex shape instead of concave shape as in Figs. 2-7. Superimposed on each of the convex horizontal primary flutes 16 is a series of vertical secondary flutes D of concave shape and of progressively increasing light spread throughout its vertical extent so as to horizontally spread the resultant light beam therefrom throughout a wider angle at the bottom than at the top in the same manner as in the previous form of the invention. For this purpose each vertical flute D is divided into plurality of individual flute segments D1, D2, D3 and D4 of successively increased horizontal light spread from bottom to top of the respective flute D, the direction of increase in horizontal spread of the flute segments D1, D2, etc. in flutes D being the reverse of that in the flutes A, B, and C in the lens of Figs. 2-7 because of the reverse light refraction characteristics of the convex primary flutes 16 over those of the concave primary flutes 13 in Figs. 2-7. In the particular len illustrated in Figs. 8-12, the horizontal spread of the various individual flute segments D1, D2, etc. is as follows:

| Flute Segment | Horizontal Light Spread |
| --- | --- |
|  | Degrees |
| D1 | 28 |
| D2 | 21 |
| D3 | 18 |
| D4 | 15 |

The pattern of the resultant light beam from a lamp such as shown in Fig. 1 provided with the modified form of lens shown in Figs. 8-12 is substantially the same as that shown in Fig. 15 for the first form of lens illustrated in Figs. 2-7, i. e., of substantially inverted keystone shape.

Changes may be made in the design of the lens without departing from the spirit of the invention, such as by placing the various flutes on the exterior or outer surface of the lens instead of on the interior surface as shown, or by providing the horizontal primary flutes on one side of the lens and the vertical secondary flutes on the other side thereof. Also, the light-directing effect may be derived from a configurated reflecting surface 5 instead of from a lens.

What I claim as new and desire to secure by Letters Patent of the United States is:

1. A light projection device comprising a concave reflector member of approximately paraboloidal shape, a light-transmitting cover glass member across the open end of said reflector member, and a concentrated light source mounted approximately at the focus of said reflector member, one of said members being provided with a series of horizontal primary flutes of relatively large size for vertically spreading the light beam therefrom, and a series of smaller vertical secondary flutes superimposed on each of said horizontal flutes, each of said vertical flutes being of progressively increasing light spread throughout its vertical extent to horizontally spread the resultant light beam therefrom throughout a wider angle at the bottom than at the top whereby to produce a beam pattern of approximately inverted keystone shape.

2. A light projection device comprising a concave reflector of approximately paraboloidal shape, a lens covering the open end of said reflector, and a concentrated light source mounted approximately at the focus of said reflector, said lens being provided with a series of horizontal primary flutes of relatively large size for vertically spreading the light beam therefrom, and a series of smaller vertical secondary flutes superimposed on each of said horizontal flutes, each of said vertical flutes being of progressively increasing light spread throughout its vertical extent to horizontally spread the resultant light beam therefrom throughout a wider angle at the bottom than at the top whereby to produce a beam pattern of approximately inverted keystone shape.

3. A light projection device comprising a concave reflector of approximately paraboloidal shape, a lens covering the open end of said reflector, and a concentrated light source mounted approximately at the focus of said reflector, said lens being provided with a series of horizontal primary flutes of concave shape and of relatively large size, and a series of smaller vertical secondary flutes superimposed on each of said horizontal flutes, each of said vertical flutes being of progressively increasing light spread from top to bottom.

4. A light projection device comprising a concave reflector of approximately paraboloidal shape, a lens covering the open end of said reflector, and a concentrated light source mounted approximately at the focus of said reflector, said lens being provided with a series of horizontal primary flutes of convex shape and of relatively large size, and a series of smaller vertical secondary flutes superimposed on each of said horizontal flutes, each of said vertical flutes being of progressively decreasing light spread from top to bottom.

5. A headlamp lens divided into a series of horizontal primary flutes of relatively large size for vertically spreading the light beam therefrom, and a series of smaller vertical secondary flutes superimposed on each of said horizontal flutes, each of said vertical flutes being of progressively increasing light spread throughout its vertical extent to horizontally spread the resultant light beam therefrom throughout a wider angle at the bottom than at the top whereby to produce a beam pattern of approximately inverted keystone shape.

6. A headlamp lens divided into a series of horizontal primary flutes of concave shape and of relatively large size, and a series of smaller vertical secondary flutes superimposed on each of said horizontal flutes, each of said vertical flutes being horizontally divided into a plurality of individual flute segments of successively increased horizontal light spread from top to bottom of the respective vertical flute.

7. A headlamp lens divided into a series of horizontal primary flutes of convex shape and of relatively large size, and a series of smaller vertical secondary flutes superimposed on each of said horizontal flutes, each of said vertical flutes being horizontally divided into a plurality of individual flute segments of successively decreased horizontal light spread from top to bottom of the respective vertical flute.

JOHN O. GEISSBUHLER.

REFERENCES CITED

The following references are of record in the file of this patent:

UNITED STATES PATENTS

| Number | Name | Date |
| --- | --- | --- |
| 1,399,749 | Conklin | Dec. 13, 1921 |
| 2,170,682 | Frech et al. | Aug. 22, 1939 |